(12) United States Patent
Robinson

(10) Patent No.: US 12,344,035 B1
(45) Date of Patent: Jul. 1, 2025

(54) TIRE AND WHEEL ASSEMBLY LIFTING DEVICE

(71) Applicant: Kevin A. Robinson, Brighton, CO (US)

(72) Inventor: Kevin A. Robinson, Brighton, CO (US)

( * ) Notice: Subject to any disclaimer, the term of this patent is extended or adjusted under 35 U.S.C. 154(b) by 360 days.

(21) Appl. No.: 18/130,869

(22) Filed: Apr. 4, 2023

Related U.S. Application Data

(63) Continuation-in-part of application No. 17/124,364, filed on Dec. 16, 2020, now Pat. No. 11,745,540.

(60) Provisional application No. 62/958,238, filed on Jan. 7, 2020.

(51) Int. Cl.
   *B66F 15/00* (2006.01)
   *B60B 29/00* (2006.01)

(52) U.S. Cl.
   CPC .......... *B60B 29/001* (2013.01); *B60B 29/002* (2013.01); *B60B 2340/12* (2013.01); *B60B 2340/34* (2013.01); *B60B 2340/36* (2013.01); *B60B 2340/50* (2013.01); *B60B 2340/70* (2013.01)

(58) Field of Classification Search
   CPC ...... B66F 15/00; B60B 29/001; B60B 29/002
   See application file for complete search history.

(56) References Cited

U.S. PATENT DOCUMENTS

| | | | | |
|---|---|---|---|---|
| 269,435 | A * | 12/1882 | Lewis | B66F 15/00 |
| | | | | 254/120 |
| 7,104,554 | B2 * | 9/2006 | Perras | B60B 29/001 |
| | | | | 414/490 |
| 10,259,108 | B2 * | 4/2019 | Duncan | B25B 27/02 |
| 10,793,410 | B2 * | 10/2020 | Liou | B65G 7/02 |
| 11,745,540 | B1 * | 9/2023 | Robinson | B66F 15/00 |
| | | | | 254/131 |
| 2005/0046131 | A1 * | 3/2005 | Gunderson | B62B 1/14 |
| | | | | 280/47.27 |
| 2014/0117295 | A1 * | 5/2014 | Shaw | E04H 17/265 |
| | | | | 254/30 |
| 2017/0334697 | A1 * | 11/2017 | Jackson | B25G 3/24 |
| 2023/0129518 | A1 * | 4/2023 | Hardin | B66F 5/02 |
| | | | | 414/743 |
| 2023/0391598 | A1 * | 12/2023 | Su | B66F 15/00 |

* cited by examiner

*Primary Examiner* — Lee D Wilson
(74) *Attorney, Agent, or Firm* — QuickPatents; Kevin Prince

(57) ABSTRACT

A device for lifting a wheel and rolling the wheel on a surface includes an elongated rigid plate having a top side, a bottom side, a peripheral edge, a pedal portion at a rear end of the rigid plate, and a wheel portion at a forward end of the rigid plate. A ground roller is fixed with the bottom side of the rigid plate and at least two wheel rollers are fixed with a top side of the wheel portion. In use, with the wheel resting on the wheel rollers, the pedal portion may be pressed downwardly to pivot the rigid plate about the roller to lift the wheel. The lifting device is then rolled on the surface to place the wheel at a desired position, and rotated until obtaining a desired rotational orientation.

20 Claims, 8 Drawing Sheets

TIRE AND WHEEL ASSEMBLY LIFTING DEVICE

CROSS-REFERENCE TO RELATED APPLICATIONS

This application is a Continuation-in-Part of U.S. Ser. No. 17/124,364, filed on Dec. 16, 2020, which itself claimed the benefit of U.S. Provisional Patent Application 62/958,238, filed on Jan. 7, 2020, both being incorporated herein by reference.

STATEMENT REGARDING FEDERALLY SPONSORED RESEARCH AND DEVELOPMENT

Not Applicable.

FIELD OF THE INVENTION

This invention relates to automotive repair, and more particularly to a device for facilitating the lifting of tires and wheel assemblies.

BACKGROUND

When changing or rotating tires on a vehicle, it is cumbersome to lift and simultaneously rotate and position the wheels for mounting on the vehicle. Such wheels, which typically include a tire mounted to a wheel rim, can be heavy and difficult to align with the vehicle.

Therefore, there is a need for a device that allows a person to easily lift and position the wheel for mounting (or dismounting) from a vehicle, or the like. The needed device would be relatively simple to manufacture and intuitive to use, and would engage the wheel at a tire tread for stability. The present invention accomplishes these objectives.

SUMMARY OF THE INVENTION

The present device is a lifting device for lifting a wheel and rolling the wheel along a surface, such as when installing the wheel onto a vehicle, for example. Typically it is cumbersome to simultaneously lift the wheel while aligning the wheel with the vehicle, and the present invention facilitates the lifting, rotating, and mounting of the wheel to the vehicle.

An elongated rigid plate has a top side, a bottom side, at least one peripheral edge, a pedal portion at a rear end of the elongated rigid plate, and a wheel portion at a forward end of the elongated rigid plate. A ground roller is fixed with the bottom side of the elongated rigid plate proximate the wheel portion. The ground roller has two opposing ends and a ground roller rotational axis. In some embodiments a pair of roller tabs are formed from the elongated rigid plate and bent from two opposing sides of the elongated rigid plate to rotationally capture the ends of the ground roller, such as with a mechanical fastener being a threaded shaft and nut arrangement, for example. Alternately a U-shaped roller holder is fixed to the bottom side of the elongated rigid plate, such as by welding, and the U-shaped roller holder holds each end of the ground roller therebetween.

At least two wheel rollers are fixed with the wheel portion of the elongated rigid plate. Each wheel roller has two opposing ends and a rotational axis that is mutually parallel with that of each other wheel roller and orthogonal to the ground roller rotational axis. In some embodiments each wheel roller is fixed with the wheel portion of the elongated rigid plate at a pair of opposing wheel portion extensions that extend laterally away from the wheel portion of the elongated rigid plate. The wheel rollers may be fixed to the wheel portion with a pair of the roller tabs formed from the wheel portion extension and bent upwardly from two opposing sides thereof. Alternately, the wheel rollers may be fixed to the wheel portion with one of the U-shaped roller holders that rotationally captures the ends of the wheel roller therein.

In an alternate embodiment of the invention, each of the wheel rollers is fixed with the wheel portion of the elongated rigid plate at a wheel roller bracket. Each wheel roller is fixed with a top side of the wheel roller bracket, preferably with a pair of the roller tabs formed from the wheel roller bracket and bent upwardly from two opposing sides thereof to rotationally capture the ends of the wheel roller. Alternately each wheel roller is fixed with the wheel roller bracket with one of the U-shaped roller holders that rotationally captures the ends of the wheel roller therein. In some embodiments, the wheel roller bracket includes at least two downwardly projecting prongs that each engage one side of the wheel portion of the elongated rigid plate to inhibit rotation of the wheel roller bracket with respect to the elongated rigid plate.

As such, in use, with the wheel resting on the wheel portion of the elongated rigid plate, the pedal portion may be pressed downwardly such as with a person's foot to pivot the elongated rigid plate about the ground roller to lift the wheel. The lifting device is then rolled on the surface to place the wheel at a desired position for mounting on the vehicle. A gap is defined between the surface and the wheel portion of the elongated rigid plate, the wheel portion being substantially parallel with the surface. The wheel is then rotated on the at least one wheel roller to a desired rotational position for facilitating mounting of the wheel onto the vehicle.

The present invention is a device that allows a person to easily lift, position, and rotate a wheel for mounting (or dismounting) from a vehicle, or the like. The present invention is relatively simple to manufacture and intuitive to use, and engages the wheel at a tire tread for stability. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
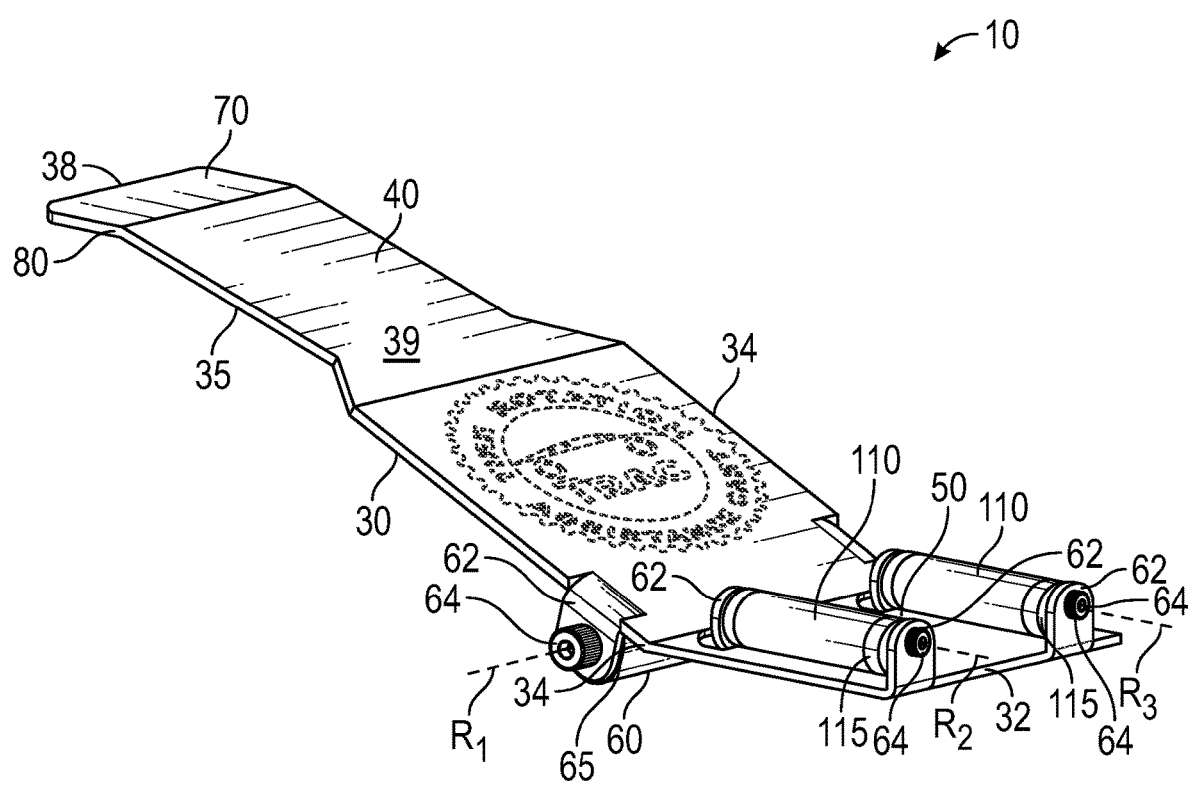
FIG. 1 is a top perspective view of one embodiment of the invention.
Figure 2:
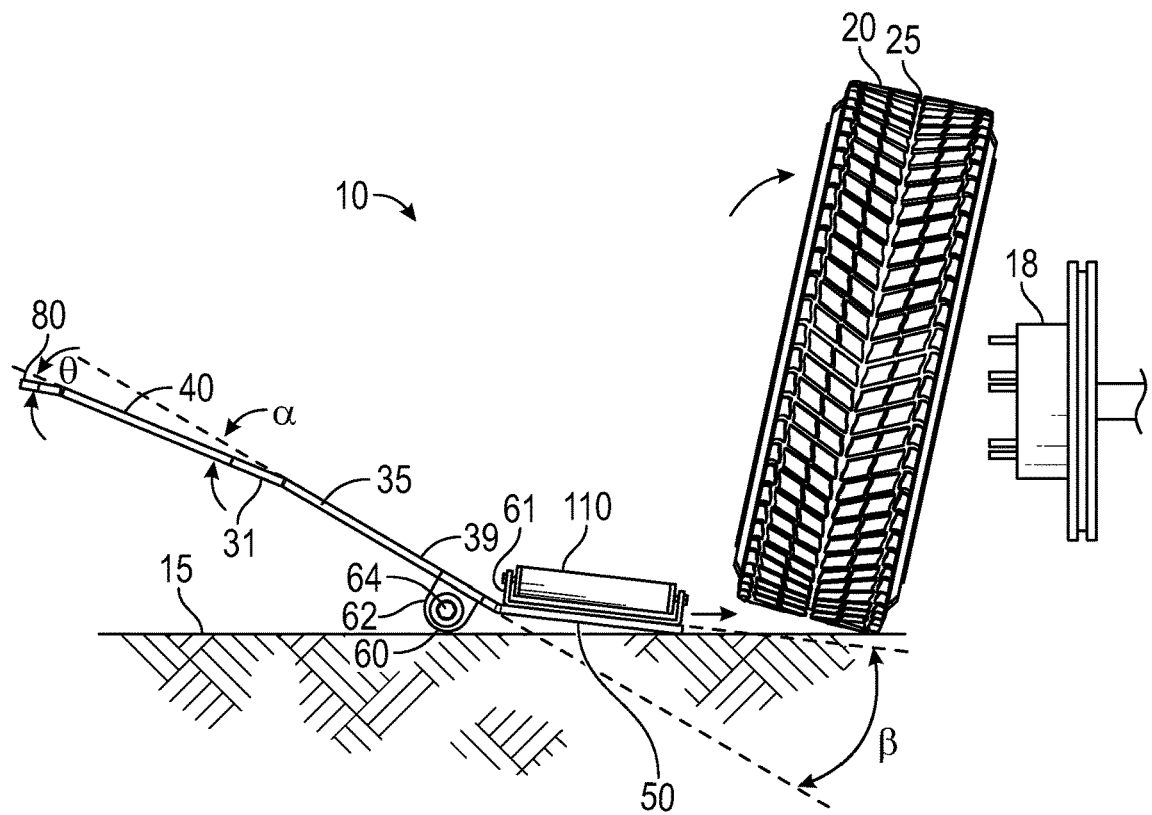
FIG. 2 is a side elevational view of the invention as approaching a wheel to lift.
Figure 3:
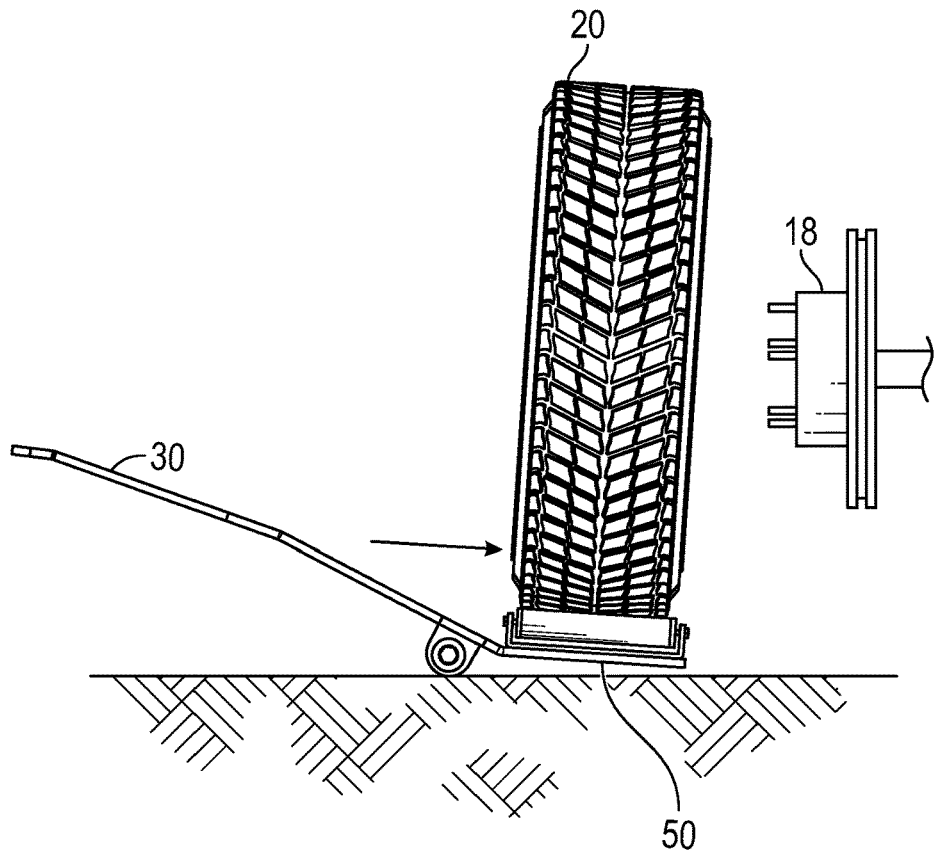
FIG. 3 is a side elevational view of the invention as positioned under the wheel.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

FIGS. 1-5 illustrate a lifting device 10 for lifting a wheel 20 and rolling the wheel 20 on a surface 15, such as when installing the wheel 20 onto a vehicle 18, for example. Typically it is cumbersome to simultaneously lift the wheel 20 while aligning the wheel 20 with the vehicle 18, and the present invention facilitates the lifting, rotating, and mounting of the wheel 20 to the vehicle 18.

An elongated rigid plate 30 has a top side 39, a bottom side 31, at least one peripheral edge 35, a pedal portion 40 at a rear end 38 of the elongated rigid plate 30, and a wheel portion 50 at a forward end 32 of the elongated rigid plate 30. Preferably the elongated rigid plate 30 is made from a rigid sheet metal material, which is formed by stamping, water-jet, laser, or the like from a metal sheet material.

Figure 6:
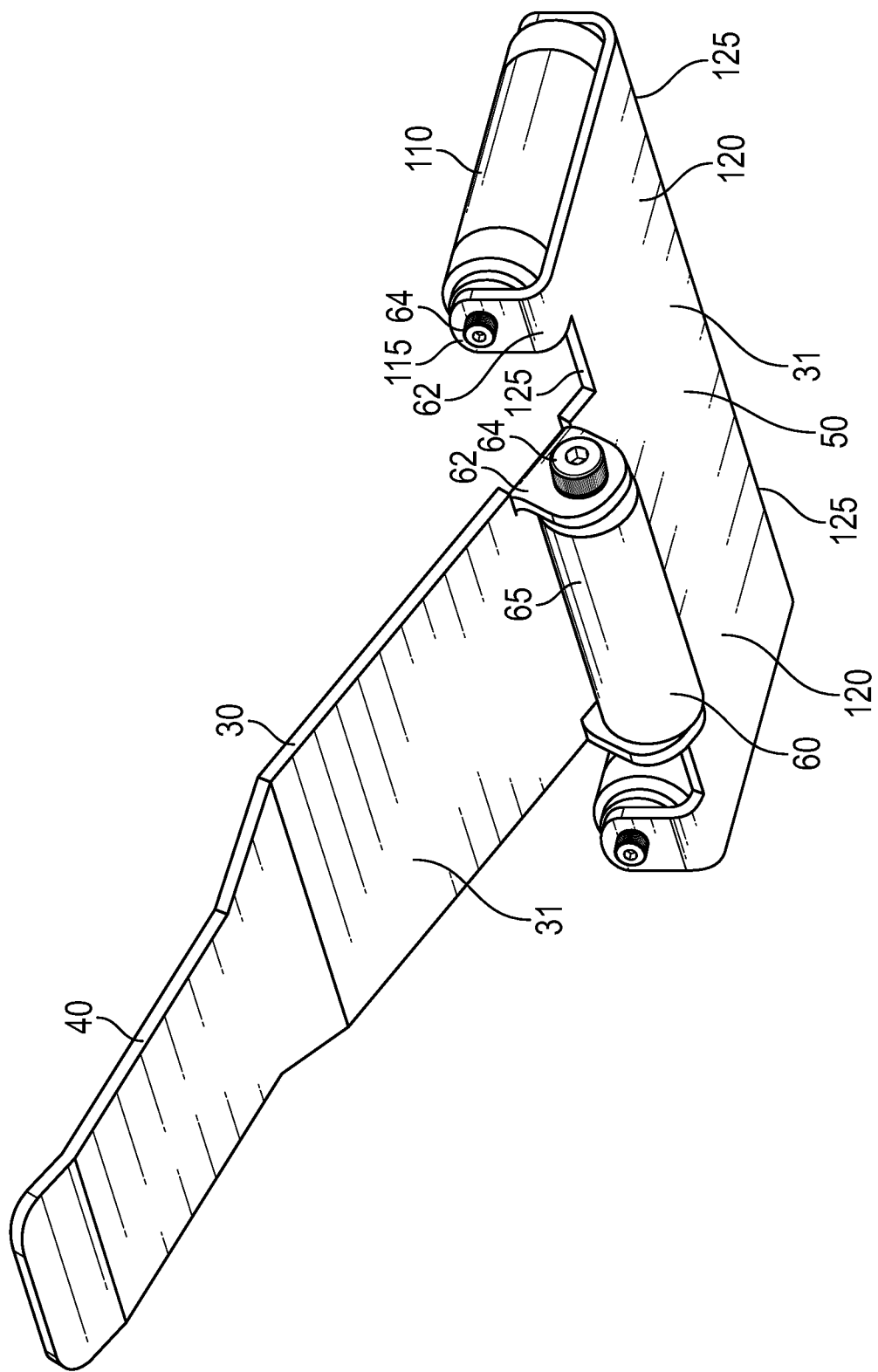
FIG. 6 is a bottom perspective view of an alternate embodiment of the invention.
Figure 7:
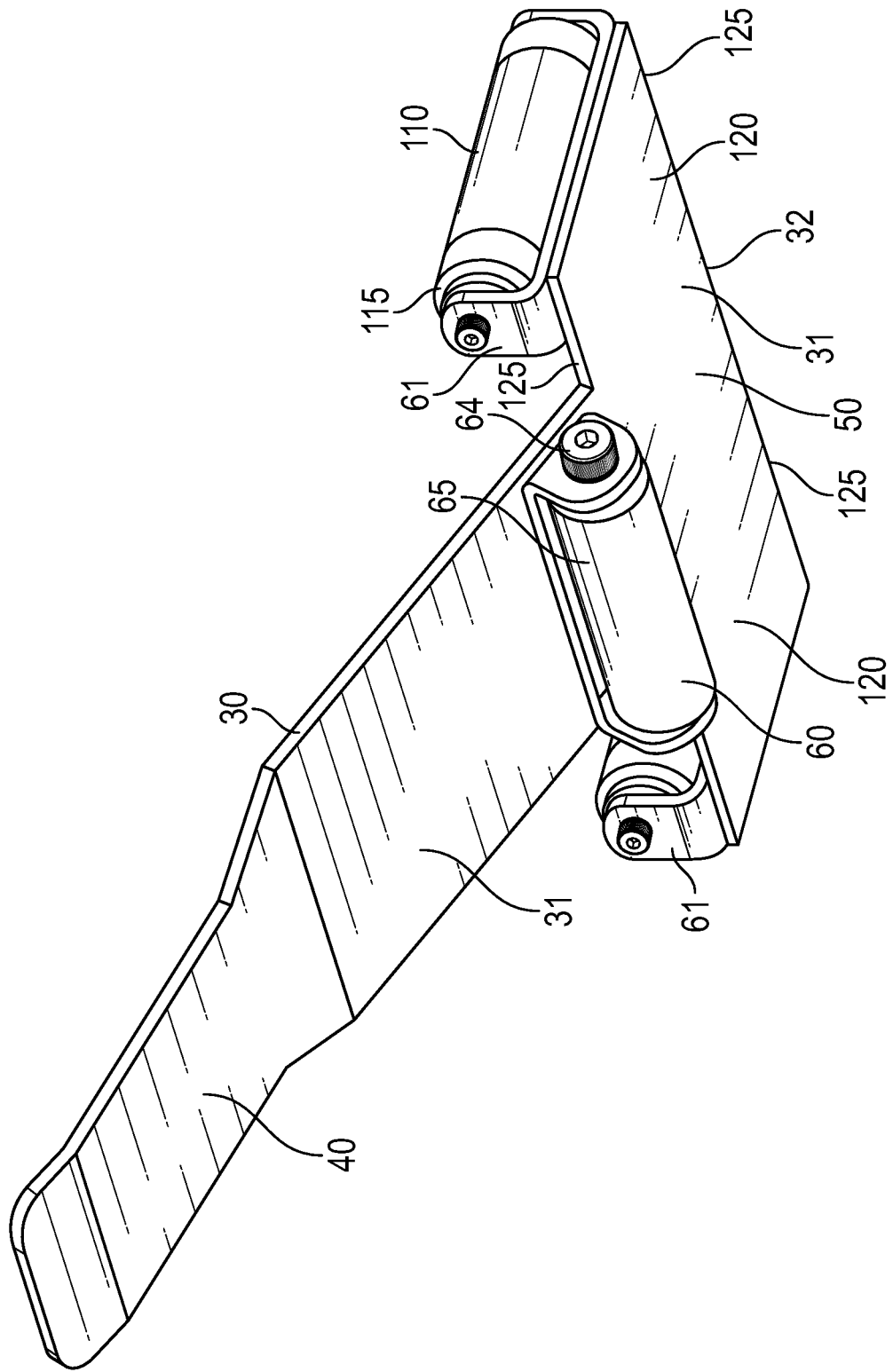
FIG. 7 is a top perspective view of another alternate embodiment of the invention.
Figure 8:
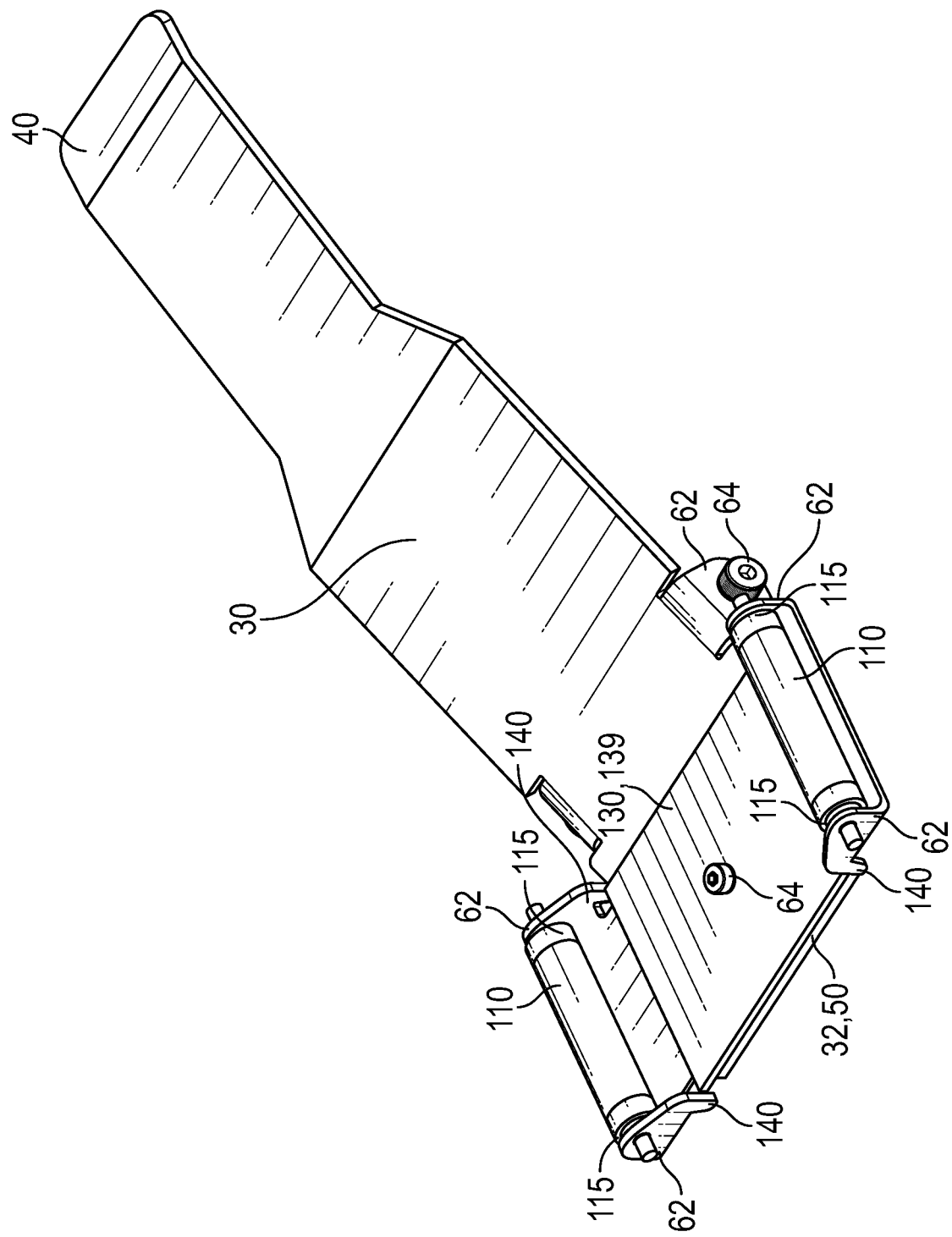
FIG. 8 is a bottom plan view of the embodiment of FIG. 7.

A ground roller 60 is fixed with the bottom side 31 of the elongated rigid plate 30 proximate the wheel portion 50. The ground roller 60 has two opposing ends 65 and a ground roller rotational axis $R_1$. In some embodiments a pair of roller tabs 62 (FIGS. 1, 6 and 8) are formed from the elongated rigid plate 30 and bent from two opposing sides 34 of the elongated rigid plate 30 to rotationally capture the ends 65 of the ground roller 60, such as with a mechanical fastener 64 being a threaded shaft and nut arrangement, for example. Alternately a U-shaped roller holder 61 (FIGS. 2-4, and 7) is fixed to the bottom side 31 of the elongated rigid plate 30, such as by welding, and the U-shaped roller holder 61 holds each end 65 of the ground roller 60 therebetween.

At least two wheel rollers 110 are fixed with the wheel portion 50 of the elongated rigid plate 30. Each wheel roller 110 has two opposing ends 115 and a rotational axis $R_2$ that is mutually parallel with that of each other wheel roller 110 and orthogonal to the ground roller rotational axis $R_1$. In some embodiments each of the at least two wheel rollers 110 is fixed with the wheel portion 50 of the elongated rigid plate 30 at a pair of opposing wheel portion extensions 120 (FIGS. 6 and 7) that extend laterally away from the wheel portion 50 of the elongated rigid plate 30. The wheel rollers 110 may be fixed to the wheel portion 50 with a pair of the roller tabs 62 formed from the wheel portion extension 120 and bent upwardly from two opposing sides 125 thereof. Alternately, the wheel rollers 110 may be fixed to the wheel portion 50 with one of the U-shaped roller holders 61 (FIG. 7) that rotationally captures the ends 115 of the wheel roller 110 therein.

Figure 9:
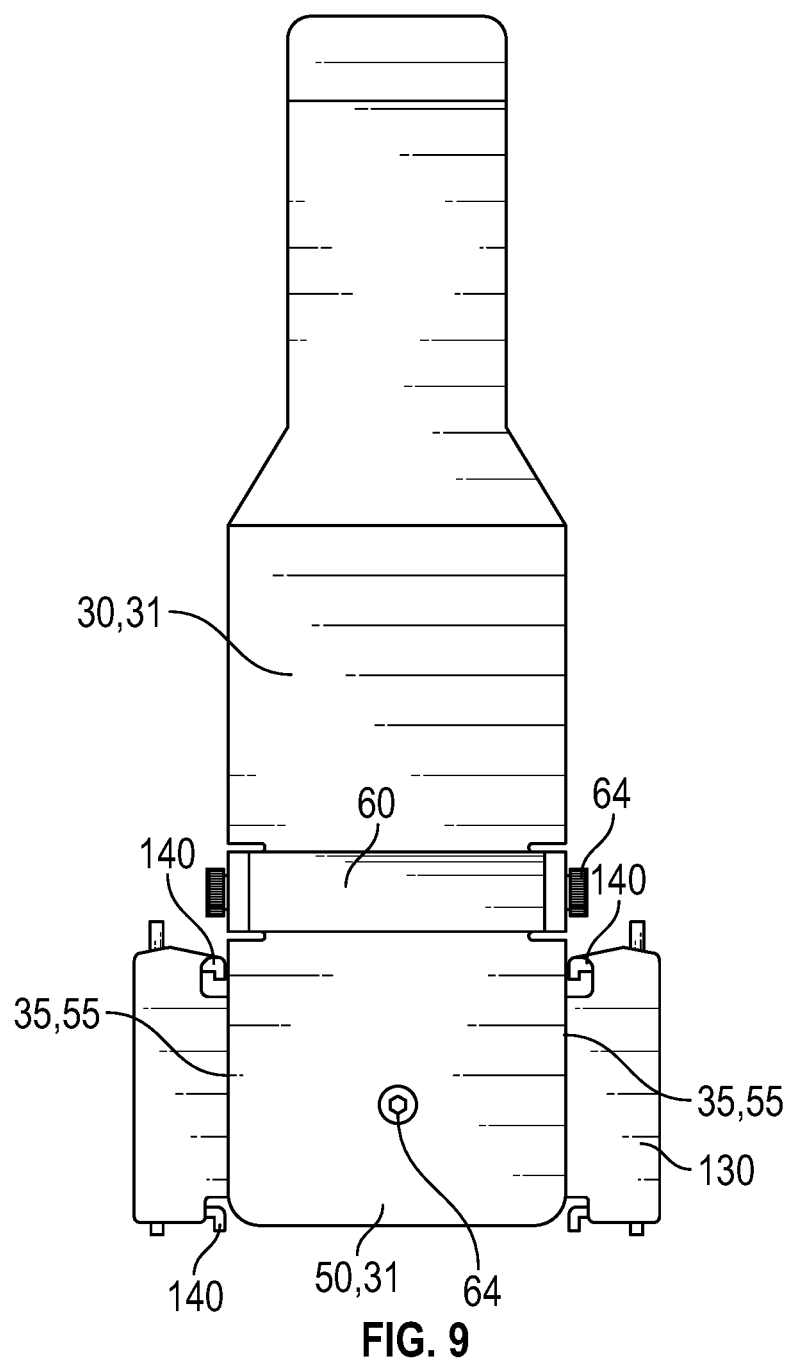
FIG. 9 is a bottom plan view of the embodiment of FIG. 7.
Figure 10:
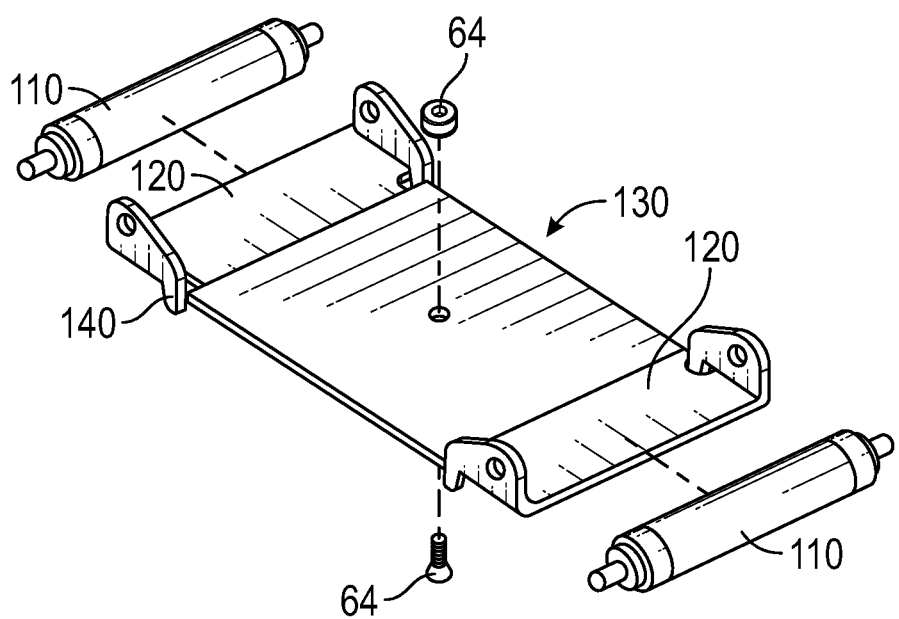
FIG. 10 is an exploded view of the embodiment of FIG. 7.

In an alternate embodiment of the invention, each of the wheel rollers 110 is fixed with the wheel portion 50 of the elongated rigid plate 30 at a wheel roller bracket 130 (FIGS. 8 and 9), formed from a strong metal sheet material and fixed with the wheel portion 50 with a mechanical fastener 64 such as a bolt and nut, or the like. Each wheel roller 110 is fixed with a top side 139 of the wheel roller bracket 130, preferably with a pair of the roller tabs 62 (FIG. 8) formed from the wheel roller bracket 130 and bent upwardly from two opposing sides 135 thereof to rotationally capture the ends 115 of the wheel roller 110. Alternately each wheel roller 110 is fixed with the wheel roller bracket 130 with one of the U-shaped roller holders 61 that rotationally captures the ends 115 of the wheel roller 110 therein. In some embodiments, the wheel roller bracket 130 includes at least two downwardly projecting prongs 140 (FIGS. 8 and 9) that each engage one side 55 of the wheel portion 50 of the elongated rigid plate 30 to inhibit rotation of the wheel roller bracket 130 with respect to the elongated rigid plate 30.

Figure 4:
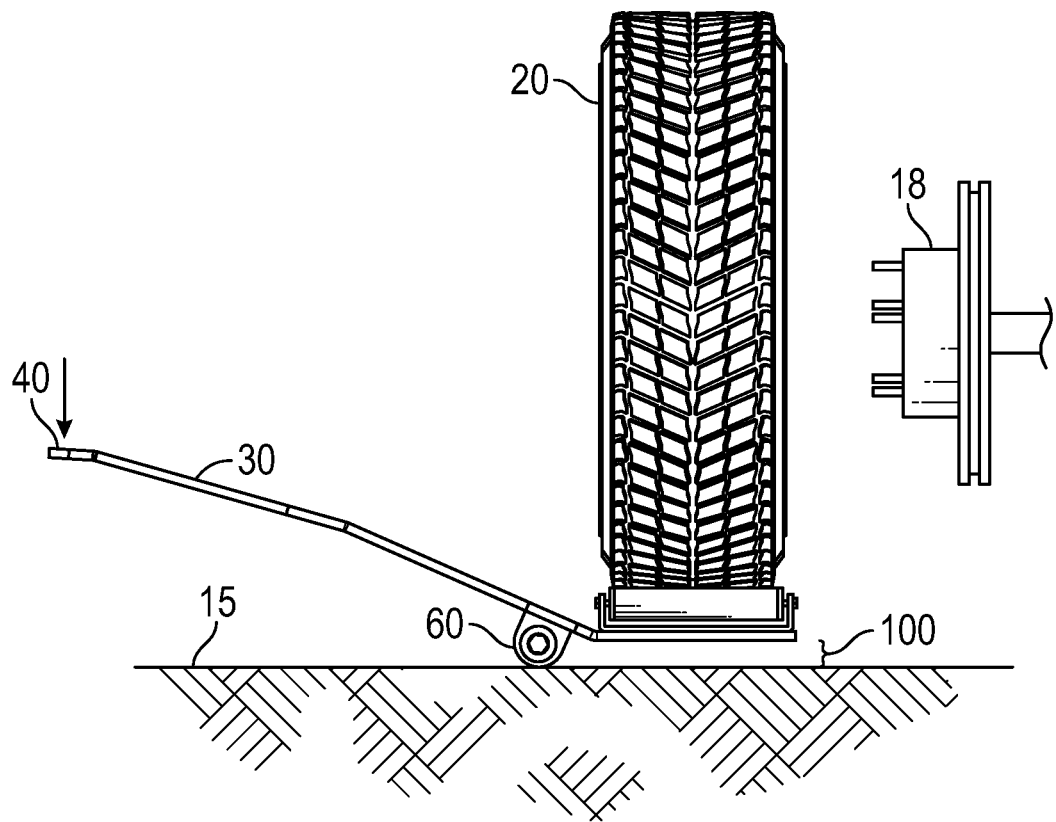
FIG. 4 is a side elevational view of the invention as lifted for mounting onto a vehicle.
Figure 5:
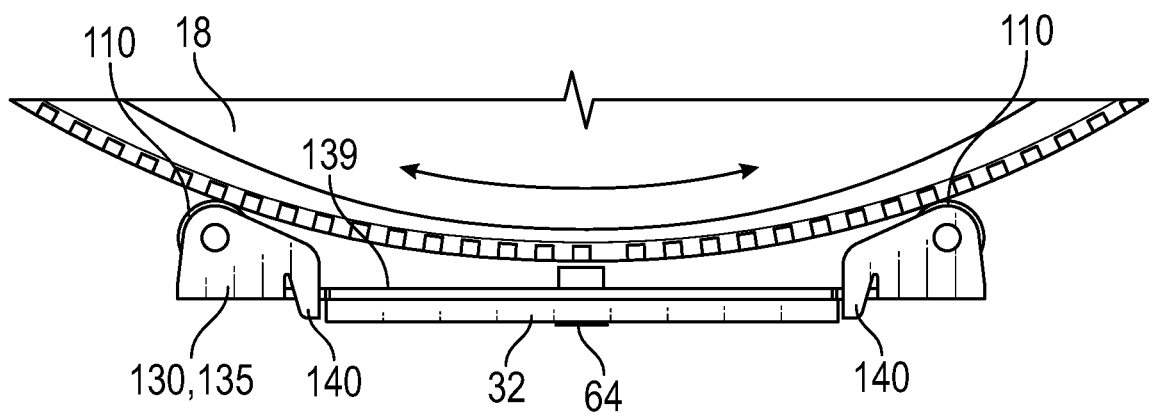
FIG. 5 is a front elevational view of the invention, the wheel rotatable before being mounted to the vehicle.

As such, in use, with the wheel 20 resting on the wheel portion 50 of the elongated rigid plate 30, the pedal portion 40 may be pressed downwardly such as with a person's foot to pivot the elongated rigid plate 30 about the ground roller 60 to lift the wheel 20. The lifting device 10 is then rolled on the surface 15 to place the wheel 20 at a desired position for mounting on the vehicle 18. A gap 100 is defined between the surface 15 and the wheel portion 50 of the elongated rigid plate 30, the wheel portion 50 being substantially parallel with the surface 15 (FIG. 4). The wheel 20 is then rotated on the at least one wheel roller 110 (FIG. 5) to a desired rotational position for facilitating mounting of the wheel 20 onto the vehicle 18.

In some embodiments an anti-slip friction coating 70 is applied to the top side 39 of the elongated rigid plate 30 at the pedal portion 40. In some embodiments the pedal portion 40 of the elongated rigid plate 30 is narrower than the rest of the elongated rigid plate 30 (FIGS. 1 and 6-9).

Preferably the pedal portion 40 terminates at a downwardly-angled foot-engaging portion (FIGS. 1 and 2), which is downwardly-angled at between 10 to 15-degrees ($\theta$) with respect to the rest of the pedal portion 40. The pedal portion 40 is preferably downwardly-angled at between 5 to 10-degrees ($\alpha$) with respect to the rest of the elongated rigid plate 30. The wheel portion 50 of the elongated rigid plate 30 is preferably upwardly-angled at between 20 to 30-degrees ($\beta$) with respect to the rest of the elongated rigid plate 30.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements 16 and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A lifting device for lifting a wheel and rolling the wheel on a surface, comprising:
   an elongated rigid plate having a top side, a bottom side, at least one peripheral edge, a pedal portion at a rear end thereof, and a wheel portion at a forward end thereof;
   at least one ground roller fixed with the bottom side of the elongated rigid plate proximate the wheel portion, each at least one ground roller having two opposing ends and a ground roller rotational axis;
   at least two wheel rollers fixed with the wheel portion of the elongated rigid plate, each wheel roller having a rotational axis mutually parallel with each other wheel roller and orthogonal to the ground roller rotational axis;
   whereby with the wheel resting on the at least two wheel rollers of the wheel portion of the elongated rigid plate, the pedal portion may be pressed downwardly to pivot the elongated rigid plate about the ground roller to lift the wheel, the lifting device then rollable on the surface to place the wheel at a desired position, the wheel rotatable on the at least two wheel rollers to place the wheel at a desired rotational position.

2. The lifting device of claim 1 wherein each of the at least one ground roller is fixed with the bottom side of the elongated rigid plate with a pair of roller tabs formed from the elongated rigid plate and bent downwardly from two opposing sides thereof to rotationally capture the ends of the ground roller.

3. The lifting device of claim 1 wherein each of the at least one ground roller is fixed with the bottom side of the elongated rigid plate with a U-shaped roller holder that rotationally captures the ends of the ground roller therein.

4. The lifting device of claim 1 wherein each of the at least one wheel roller is fixed with the top side of the elongated rigid plate with a pair of roller tabs formed from the elongated rigid plate and bent upwardly from two opposing sides thereof to rotationally capture the ends of the wheel roller.

5. The lifting device of claim 1 wherein each of the at least one wheel roller is fixed with the top side of the elongated rigid plate with a U-shaped roller holder that rotationally captures the ends of the wheel roller therein.

6. The lifting device of claim 1 wherein the top side of the pedal portion includes an anti-slip friction coating.

7. The lifting device of claim 1 wherein the pedal portion of the elongated rigid plate is narrower than the rest of the elongated rigid plate.

8. The lifting device of claim 7 wherein the pedal portion terminates at a downwardly-angled foot-engaging portion.

9. The lifting device of claim 7 wherein the pedal portion of the elongated rigid plate is downwardly-angled with respect to the rest of the elongated rigid plate.

10. The lifting device of claim 1 wherein the pedal portion of the elongated rigid plate is downwardly-angled with respect to the rest of the elongated rigid plate.

11. The lifting device of claim 1 wherein the wheel portion of the elongated rigid plate is upwardly-angled with respect to the rest of the elongated rigid plate.

12. The lifting device of claim 11 wherein with the wheel portion of the elongated rigid plate substantially parallel to the surface and with the roller resting on the surface, a gap is defined between the surface and the wheel portion of the elongated rigid plate.

13. The lifting device of claim 1 wherein each of the at least two wheel rollers is fixed with the wheel portion of the elongated rigid plate at a pair of opposing wheel portion 18 extensions that extend laterally away from the wheel portion of the elongated rigid plate.

14. The lifting device of claim 13 wherein each of the at least one wheel roller is fixed with a top side of one of the wheel portion extensions with a pair of roller tabs formed from the wheel portion extension and bent upwardly from two opposing sides thereof to rotationally capture the ends of the wheel roller.

15. The lifting device of claim 13 wherein each of the at least one wheel roller is fixed with a top side of the wheel portion extensions with a U-shaped roller holder that rotationally captures the ends of the wheel roller therein.

16. The lifting device of claim 1 wherein each of the at least two wheel rollers is fixed with the wheel portion of the elongated rigid plate at a wheel roller bracket fixed with the wheel portion of the elongated rigid plate, each of the at least two wheel rollers fixed with a top side of the wheel roller bracket.

17. The lifting device of claim 16 wherein each of the at least one wheel roller is fixed with the top side of the wheel roller bracket with a pair of roller tabs formed from the wheel roller bracket and bent upwardly from two opposing sides thereof to rotationally capture the ends of the wheel roller.

18. The lifting device of claim 16 wherein each of the at least one wheel roller is fixed with a top side of the wheel roller bracket with a U-shaped roller holder that rotationally captures the ends of the wheel roller therein.

19. The lifting device of claim 16 wherein the wheel roller bracket is fixed with the wheel portion of the elongated rigid plate with at least one mechanical fastener.

20. The lifting device of claim 18 wherein the wheel roller bracket includes at least two downwardly projecting prongs that each engage one side of the wheel portion of the elongated rigid plate to inhibit rotation of the wheel roller bracket on the elongated rigid plate.

\* \* \* \* \*